US006934334B2

(12) United States Patent
Yamaguchi et al.

(10) Patent No.: US 6,934,334 B2
(45) Date of Patent: Aug. 23, 2005

(54) METHOD OF TRANSCODING ENCODED VIDEO DATA AND APPARATUS WHICH TRANSCODES ENCODED VIDEO DATA

(75) Inventors: Noboru Yamaguchi, Yashio (JP); Toshimitsu Kaneko, Kawasaki (JP); Tomoya Kodama, Kawasaki (JP); Takeshi Mita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 467 days.

(21) Appl. No.: 09/968,544

(22) Filed: Oct. 2, 2001

(65) Prior Publication Data

US 2002/0051494 A1 May 2, 2002

(30) Foreign Application Priority Data

Oct. 2, 2000 (JP) ........................................ 2000-302665

(51) Int. Cl.[7] .............................. H04B 1/66; H04N 7/12
(52) U.S. Cl. ............................. 375/240.16; 375/240.21
(58) Field of Search ...................... 375/240.16, 240.21, 375/240.01, 240.03, 240.1, 240.09, 240.11, 240.15, 240.12; 382/232; 709/231; H04N 7/12; H04B 1/66

(56) References Cited

U.S. PATENT DOCUMENTS

| | | | |
|---|---|---|---|
| 5,708,732 A | * | 1/1998 | Merhav et al. ............. 382/232 |
| 6,557,041 B2 | * | 4/2003 | Mallart ....................... 709/231 |
| 6,647,061 B1 | * | 11/2003 | Panusopone et al. .. 375/240.12 |
| 6,671,322 B2 | * | 12/2003 | Vetro et al. ............ 375/240.16 |
| 6,735,253 B1 | * | 5/2004 | Chang et al. .......... 375/240.16 |
| 2002/0110193 A1 | * | 8/2002 | Yoo et al. .............. 375/240.02 |

FOREIGN PATENT DOCUMENTS

JP 2001-204026 7/2001

OTHER PUBLICATIONS

Junichi Nakajima, et al., "Adaptive Motion Vector Refinement for Video Transcoding", Proceedings Of General Conference on IEICE, D–11–27, Mar. 27, 2001, p. 27.
U.S. Appl. No. 09/793,580, filed Feb. 27, 2001, Pending.
U.S. Appl. No. 09/968,544, filed Oct. 2, 2001, Yamaguchi et al.
U.S. Appl. No. 10/669,356, filed Sep. 25, 2003, Kodama et al.
U.S. Appl. No. 09/968,544, filed Oct. 2, 2001, Pending.
U.S. Appl. No. 10/179,985, filed Jun. 26, 2002, Pending.

* cited by examiner

*Primary Examiner*—Tung Vo
(74) *Attorney, Agent, or Firm*—Oblon, Spivak, McClelland, Maier & Neustadt, P.C.

(57) ABSTRACT

A video transcoding method comprises decoding a first bit stream encoded by a first video encoding format to obtain decoded video data and side information, converting the decoded video data and side information into a form suitable for a second video encoding format to obtain converted video data and converted side information, and encoding the converted video data using motion vectors contained in the side information to obtain a second bit stream of the second video encoding format.

18 Claims, 11 Drawing Sheets

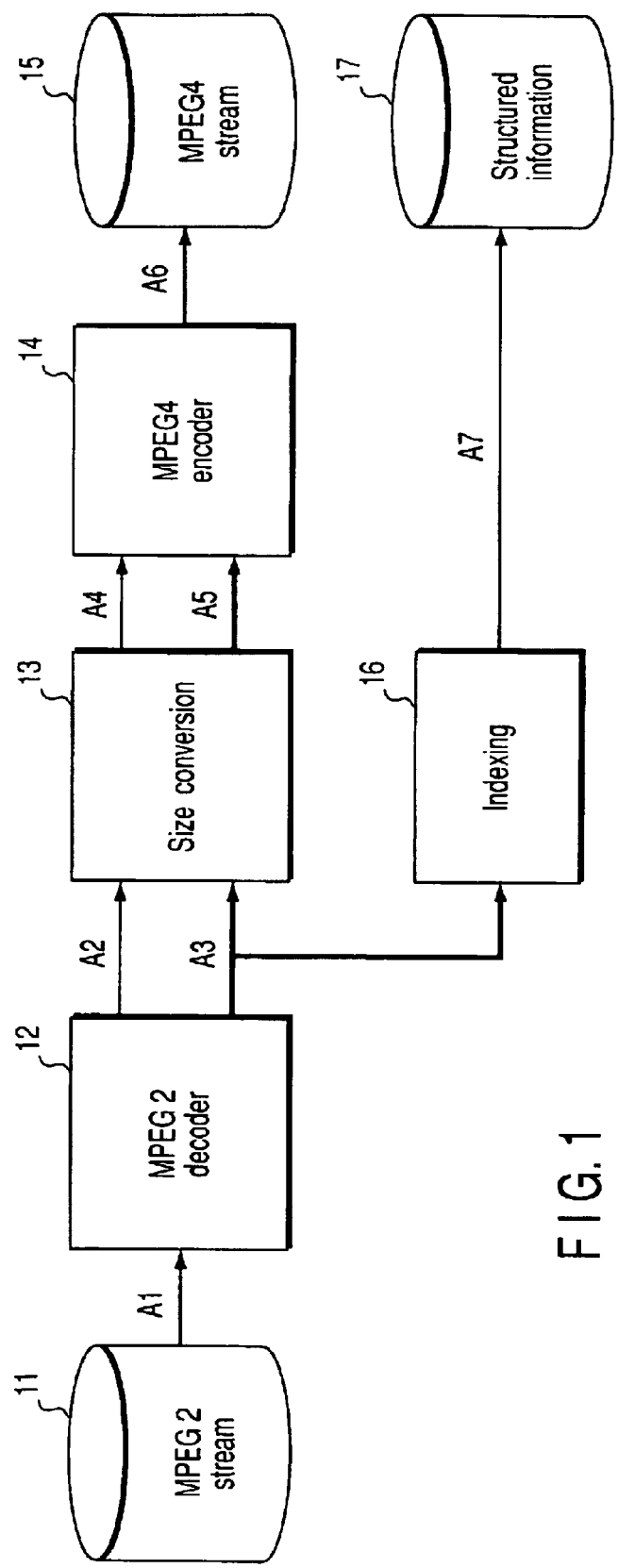
F I G. 1

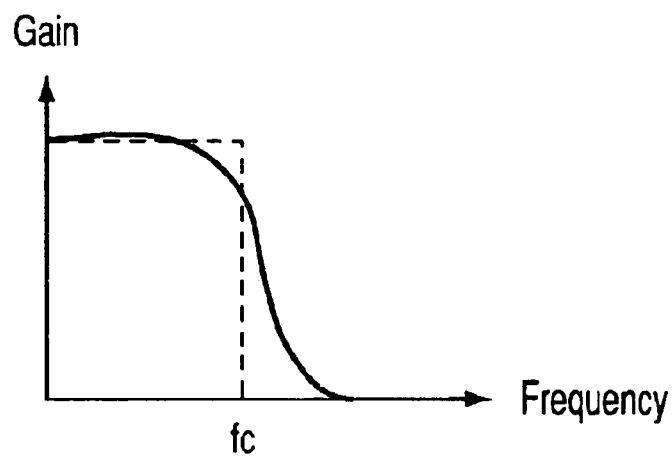
F I G. 14A
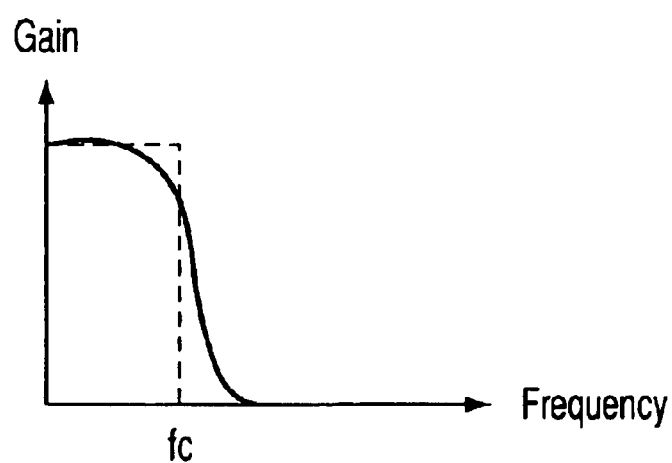
F I G. 14B

METHOD OF TRANSCODING ENCODED VIDEO DATA AND APPARATUS WHICH TRANSCODES ENCODED VIDEO DATA

CROSS-REFERENCE TO RELATED APPLICATIONS

This application is based upon and claims the benefit of priority from the prior Japanese Patent Application No. 2000-302665, filed Oct. 2, 2000, the entire contents of which are incorporated herein by reference.

BACKGROUND OF THE INVENTION

1. Field of the Invention

The invention relates to a video transcoding method of transcoding a bit stream of a first video encoding format into a bit stream of a second video encoding format, and a video transcoding apparatus which transcodes a bit stream of a first video encoding format into a bit stream of a second video encoding format.

2. Description of the Related Art

As an international standard method of video encoding, MPEG-1, MPEG-2, and MPEG-4 of ISO/IEC JTC1/SC29/WG11 are known. These encoding methods differ in a video encoding data format from one another. The technology of transforming the bit stream at high speed between such different encoding video data formats is known as a video transcoding technology. This transcoding technology is a re-encoding which once decodes an encoded bit stream and again encodes the decoded bit stream.

In a conventional video transcoding apparatus which transcodes an MPEG-2 format to an MPEG-4 format, the MPEG-2 stream stored in an MPEG-2 stream storage device is decoded by an MPEG-2 decoder.

Generally, the video signal decoded by an MPEG-2 decoder and the video signal encoded by an MPEG-4 encoder differ in a screen size from each other. For this reason, the screen size of the video signal decoded by the MPEG-2 decoder is converted by a screen size converter.

The MPEG-4 encoder encodes the video data from the size converter in the MPEG-4 format to generate an MPEG-4 encoded stream, and stores the MPEG-4 encoded stream in a storage device. At this time, the encoder detects motion vectors of the video data, and the video data is reconstructed based on the motion vectors.

Thus, in the conventional transcoding technology, when transcoding the bit stream from MPEG-2 format to MPEG-4 format, the processing for detecting the motion vector must be executed. For this reason, a long time is required for transcoding the encoding format.

BRIEF SUMMARY OF THE INVENTION

It is an object of the present invention to provide a video transcoding method and a video transcoding apparatus which transcodes a bit stream of an encoding format into a bit stream of another encoded format at high speed.

According to the first aspect of the invention, there is provided a video transcoding method, comprising: decoding a first bit stream encoded by a first video encoding format to obtain decoded video data and side information; converting the decoded video data and side information corresponding to the first video encoding format into a form suitable for a second video encoding format to obtain converted video data and side information; and encoding the converted video data in the second video encoding format using motion vectors contained in the side information to obtain a second bit stream of the second video encoding format.

According to the second aspect of the invention, there is provided a video transcoding apparatus comprising: a decoder which decodes a first bit stream encoded by a first video encoding format to output decoded video data and side information; a converter which converts the decoded video data and side information corresponding to the first video encoding format into a form suitable for a second video encoding format to output converted video data and side information; and an encoder which encodes the converted video data in a second video encoding format, using motion vectors contained in the converted side information to output a second bit stream of the second video encoding format.

According to the third aspect of the invention, there is provided a video transcoding program stored on a computer readable medium, comprising: code means for causing a computer to decode a first bit stream encoded by a first video encoding format and output decoded video data and side information; code means for causing the computer to convert the decoded video data and decoded side information into a form suitable for a second video encoding format and output converted video data and side information; and code means for causing the computer to encode the converted video data in a second video encoding format, using motion vectors contained in the side information and output a second bit stream of the second video encoding format.

BRIEF DESCRIPTION OF THE SEVERAL VIEWS OF THE DRAWING

FIG. 1 shows a block circuit diagram of a video transcoding apparatus according to the first embodiment of the invention;

FIGS. 14A and 14B show views illustrating filter characteristics in MPEG-4 encoding.

DETAILED DESCRIPTION OF THE INVENTION

Figure 2:
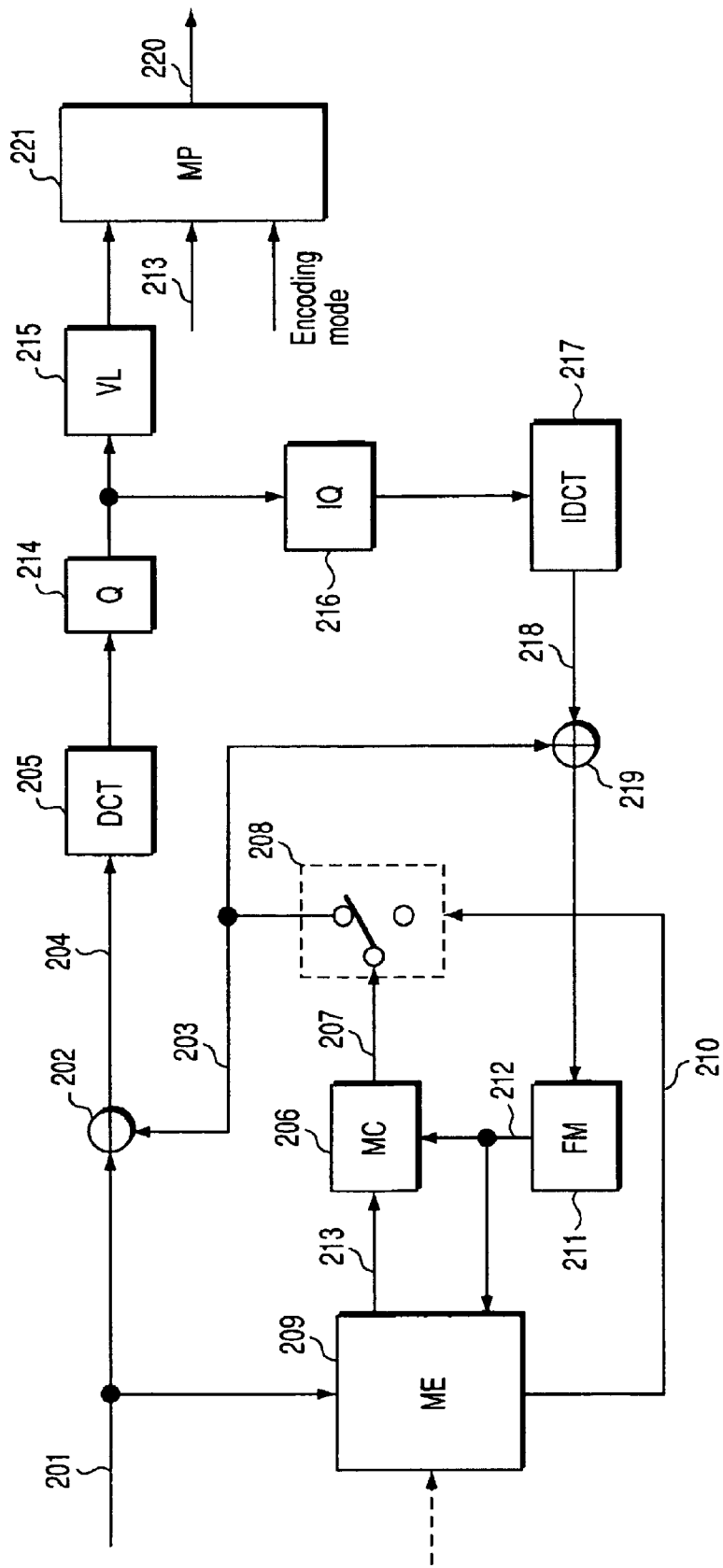
FIG. 2 shows a block circuit diagram of a video encoding apparatus.

There will now be described embodiments of this invention in conjunction with the drawing. (The whole configuration of the video transcoding apparatus).

According to the first embodiment of this invention, the transcoding apparatus transcodes a bit stream of MPEG-2 format to a bit stream of MPEG-4 format. In FIG. 1, the MPEG-2 stream A1 stored in the MPEG-2 stream storage device 11 is read out and decoded by the MPEG-2 decoder 12, so that decoded video data A2 and side information A3 are output from the MPEG-2 decoder 12.

The side information A3 includes a time stamp of a decoded picture, mode information and motion vector information of each macro-block (MB), that are internal information obtained in decoding of the MPEG-2 stream.

The decoded video data A2 and the side information A3 which are output from the MPEG-2 decoder 12 are input to the size converter 13. The video data A2 decoded by the MPEG-2 decoder 12 differs in screen size from the video data A6 encoded by the MPEG-4 encoder 14. For this reason, the size converter 13 converts the frame size of the MPEG-2 decoded video data A2 into the frame size of MPEG-4 encoded data. The size converter 13 also converts the side information A3 into a form suitable for the MPEG-4 encoder 14.

The decoded video data A4 and side information A5 output from the size converter 13 are encoded to an MPEG-4 stream A6 by the MPEG-4 encoder 14. The MPEG-4 stream A6 is stored in the MPEG-4 stream storage device 15.

In the embodiment, the video data A2 output from the MPEG-2 decoder 12 is subjected to indexing which marks on the picture corresponding to scene change. That is, the indexing device 16 extracts motion vectors from the side information A3 output from the MPEG-2 decoder 12, and performs the indexing based on the extracted motion vector, as described hereinafter. The structured data A7 output from the indexing device 16 is stored in the structured data storage device 17.

FIG. 1 shows a video transcoding apparatus in which the MPEG-2 stream file A1 stored in the MPEG-2 stream storage device 11 is transcoded to the MPEG-4 stream A6 to be stored in the MPEG-4 stream storage device 15. The present invention can be applied to an apparatus to which the MPEG-2 stream is supplied from the network or which applies the MPEG-4 stream to the network.

There will now be described an MPEG encoder and MPEG decoder before describing the size converter 13 and indexing device 16 that are features of the present embodiment. In MPEG-1, MPEG-2 and MPEG-4 that are the international standard of video encoding, a MC+DCT encoding comprising combination of motion compensation (MC) and discrete cosine transform (DCT) is adopted as a basic encoding.

Referring to "All of MPEG-4" ed. Miki (industrial investigating committee (1998), 3rd chapter, the MPEG encoder and MPEG decoder are described in accordance with MPEG-4 verification model as follows.
(MPEG Encoder)

FIG. 2 shows a basic configuration of a MC+DCT encoder used as an MPEG encoder (video encoding apparatus). Decoding to be performed in units of one macroblock (MB) (16*16 pixels) of a luminance signal is described.

A video signal 201 is input to a subtracter 202 which calculates difference between a video signal 201 and a prediction signal 203. The output signal 204 of the subtracter 202 is supplied to a discrete cosine transformer (DCT) 205.

When the encoding mode is an intra-frame encoding mode, a motion compensation predictive signal 207 generated by a motion compensation predictor 206 is supplied to the subtracter 202 via an intra-frame/inter-frame switch 208. On the other hand, when the encoding mode is an inter-frame encoding mode, the prediction signal 203 is to be zero. The subtracter 202 outputs not a differential signal but rather the input video signal 201 as it is.

A switching between the intra-frame mode and inter-frame mode is determined by a motion vector detector 209. The encoding mode is switched when the mode determination signal 210 is supplied from the motion vector detector 209 to the intra-frame/inter-frame switch 208.

The motion compensation predictor 206 generates a motion compensation predictive signal 207 based on an encoded frame signal 212 stored in frame memory 211 and a motion vector 213 detected by the motion vector detector 209.

The output signal 204 of the subtracter 202 is subjected to discrete cosine transform (DCT) by discrete cosine transformer 205, DCT coefficients obtained by the DCT is quantized by a quantizer 214. The quantized DCT coefficients are subjected to variable-length encoding by a variable-length encoder 215, and is also inverse-quantized by an inverse quantizer 216. The inverse quantized DCT coefficients are subjected to inverse discrete cosine transform (IDCT) by an inverse discrete cosine transformer 217. As a result, a decoded signal 218 corresponding to the output signal 204 of the subtracter 202 is generated.

An adder 219 adds the decoded signal 218 from the inverse discrete cosine transformer 217 and the prediction signal 203, to generate a local decoded video signal. The local decoded video signal is stored in the frame memory 211.

The variable-length encoder 215 subjects side information such as a quantized DCT coefficient from the quantizer 214, motion vector information 213 and encoding mode information to variable-length encoding. The encoded information is multiplexing by a multiplexer 221 to generate a bit stream 220 of video encoded data. The input line from the quantizer 214 to the variable-length encoder 215 is shown in FIG. 2, but others are omitted. The bit stream 220 is stored in the MPEG-2 stream storage device 11 of FIG. 1, for example, or it is sent out to a network (not shown).
(MPEG Decoder)

Figure 3:
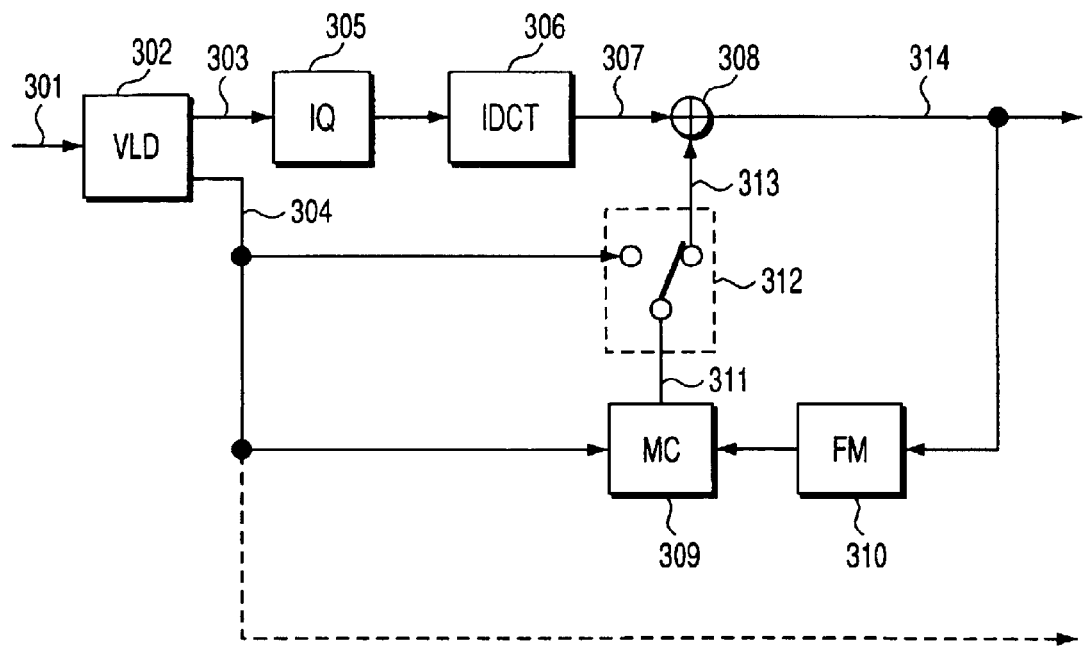
FIG. 3 shows a block circuit diagram of a video decoding apparatus.

FIG. 3 shows a configuration of a MC+DCT decoder used as an MPEG decoder (video decoding apparatus) corresponding to the encoder of FIG. 2.

In the MPEG decoder, the bit stream 301 including compression-encoded video data is input to variable-length decoder 302. The variable-length decoder 302 decodes quantized DCT coefficients 303 and side information 304. After the quantized DCT coefficients 303 are dequantized by an inverse quantizer 305, it is input to an inverse discrete cosine transformer 306. The inverse discrete cosine transformer 306 subjects the quantized DCT coefficients 303 to the inverse discrete cosine transform to reconstruct a picture signal 307.

When the current macro block indicates the intra-frame encoding mode by side information 304, the intra-frame/inter-frame switch 312 turns off a motion compensation predictive signal 311 from the motion compensation predictor 309. As a result, since the adder 308 is not supplied with the signal from the intra-frame/inter-frame switch 312, the adder outputs the picture signal 307 from the inverse discrete cosine transformer 306 as it is.

On the other hand, when the current macro block is of the inter-frame encoding mode, the intra-frame/inter-frame switch 312 turns on the motion compensation predictive signal 311 from the motion compensation predictor 309. As a result, the adder 308 adds the motion compensation predictive error signal 307 from the inverse discrete cosine transformer 306 and the motion compensation predictive signal 313 from intra-frame/inter-frame switch 312 to output an added signal as a decoded video signal 314. A part of the decoded video signal 314 is stored in the frame memory 310. The decoded video signal stored in the frame memory 310 is supplied to the motion compensation predictor 309.

There will now be described the processing of the video transcoding apparatus of the embodiment in conjunction with a flow chart of FIG. 4.

At first, the MPEG-4 encoder 14 sets an initial value of time stamp of demanded frame (demandTS) in zero, for example (step S101). The MPEG-2 stream A1 stored in the MPEG-2 stream storage device 11 is read to a stream buffer in the MPEG-2 decoder 12 (step S102).

It is determined whether a stream read in the step S102 is the trailing end of MPEG-2 stream A1 (step S103). When this determination result is YES, transcoding is ended. When determination result is NO, the MPEG-2 decoder 12 decodes the MPEG-2 stream A1 (step S104), to generate video signal A2 and side information A3.

A picture time stamp curTS of the video signal A2 is extracted from the side information A3 (step S105). The time stamp curTS is compared with a time stamp demandTS of a requested frame (step S106). When the time stamp curTS is smaller than the time stamp demandTS, processing returns to step S102, and the processings from the steps S102 to S105 are repeated. When the time stamp curTS is larger than the time stamp demandTS, the decoded video signal A2 and side information A3 corresponding to the picture are sent to the size converter 13. The size converter 13 converts the video signal A2 and side information A3 supplied by the MPEG-2 decoder 12 into a format, i.e., size suitable for the MPEG-4 encoder 14, that is, performs a size conversion, to generate converted video signal A4 and side information A5. The converted video signal A4 and side information A5 are input to the MPEG-4 encoder 14 (step S107).

The size conversion in the step S107 is described in detail hereinafter.

The MPEG-4 encoder 14 encodes (compression-encodes) the converted video signal A4 from the size converter 13 using motion vector information included in the conversion side information A5 from the size converter 13 (step S108). Concretely, the motion vector information included in the side information A5 is supplied to a motion vector detector 209 in the MPEG-4 encoder 14 as shown in a dashed line (FIG. 2). The motion vector detector 209 re-searches for a periphery of the movement vector indicated by the motion vector information. As a result, the movement vector detection requiring the most amount of processing in the encoding can be reduced in a processing amount.

The MPEG-4 stream A6 from the MPEG-4 encoder 14 is output to the MPEG-4 stream storage device 15, for example (step S109). Furthermore, the time stamp (demandTS) of the next frame which corresponds to frame skipping interval determined by the MPEG-4 encoder 14 is obtained (step S110). Thereafter, the processing returns to the step S102 to repeat the above processing.

(Size Converter 13)

There is now be described in detail the size converter 13 in conjunction with FIGS. 5, 6 and 7.

Figure 5:
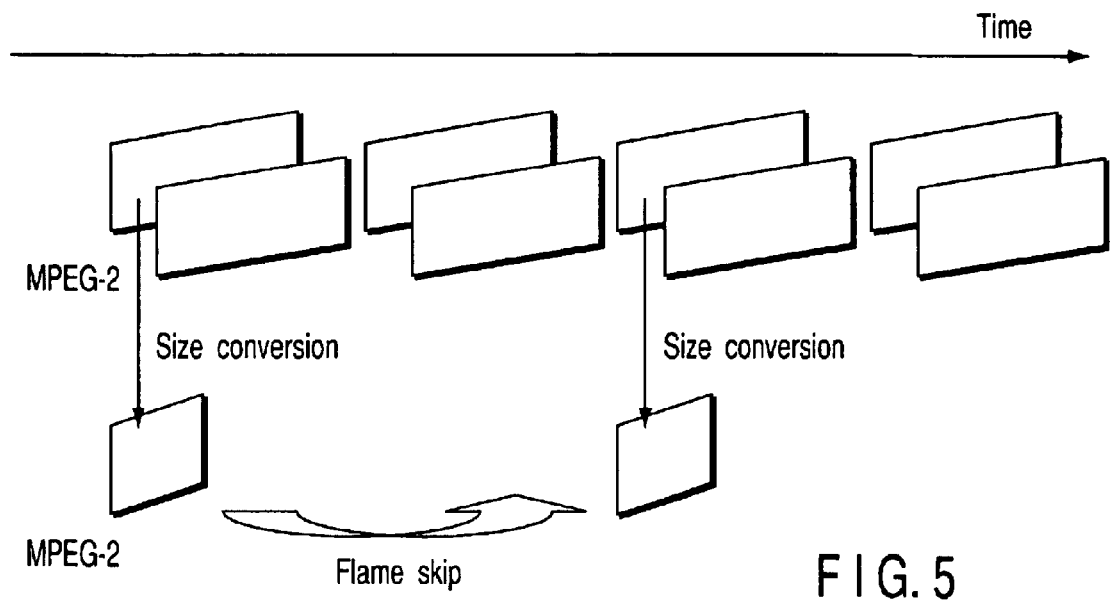
FIG. 5 is a view explaining operation of the size converter.
Figure 11:
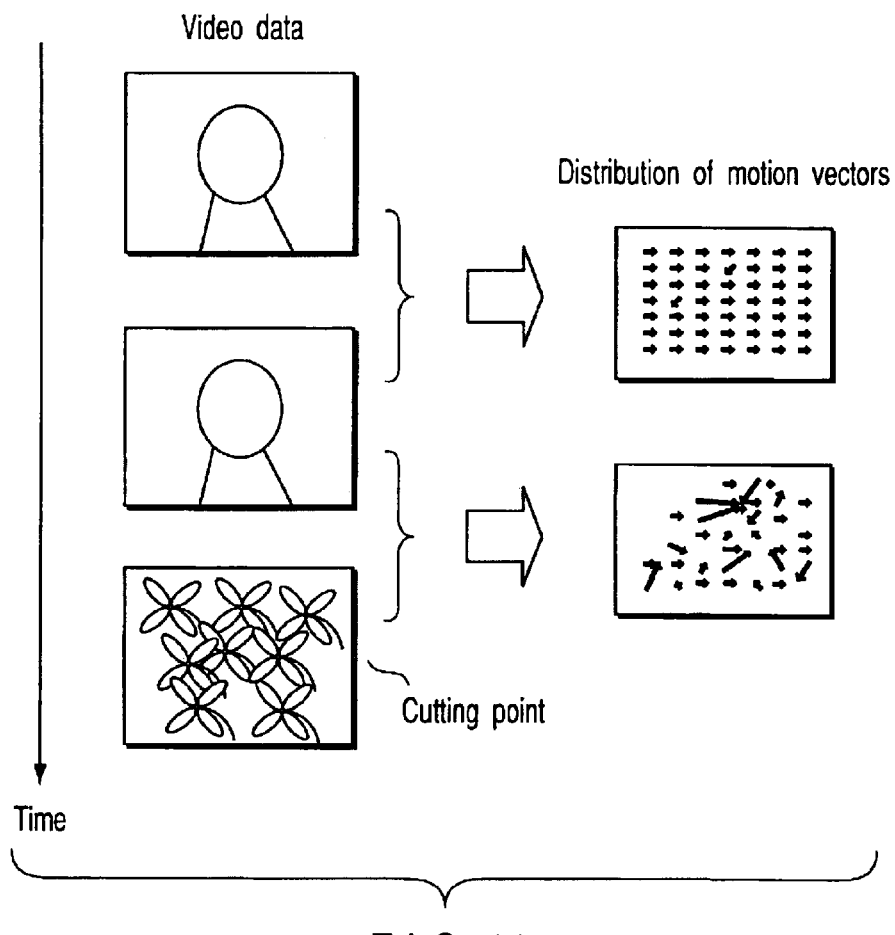
FIG. 11 is a view explanting a cutting point.

Generally, all of the output (video signal A2 and side information A3) of the MPEG-2 decoder 12 are not supplied to the size converter 13 for frame skipping, but only the output of the MPEG-2 decoder 12 that is necessary for the MPEG-4 encoder 14 is supplied to the size converter 13 as shown in FIG. 5. Accordingly, only the necessary decoded video signal may be converted in screen size as shown in FIG. 11. As a result, when the input frame rate of MPEG-4 encoder 14 differs from the frame rate of the MPEG-2 decoder 12, the throughput for the screen size conversion is reduced.

Furthermore, the size converter 13 converts the side information A3 (mode information and motion vector information for each macro block) from the MPEG-2 decoder 12 in a format suitable for the MPEG-4 encoder 14 as previously described. The converted side information A5 is input to the MPEG-4 encoder 14.

When the size converter 13 converts the screen size to a value suitable for the MPEG-4 video, the number of macro-blocks changes. FIG. 6 shows correlation between macro block addresses before and after screen size conversion. In FIG. 6, address (h, v)=(0-3, or 0-2) shows a macro-block address after size conversion. When correlation between the macro-block address (H, V) before size conversion and the macro block address (h, v) after size conversion is calculated by the following equation, the correlation shown in FIG. 6 is obtained. The term (int) indicates round-off of fractions below decimal point $$H=(int)(7 \times h/4)$$

$$V=(int)(5 \times v/3)$$

Figure 6:
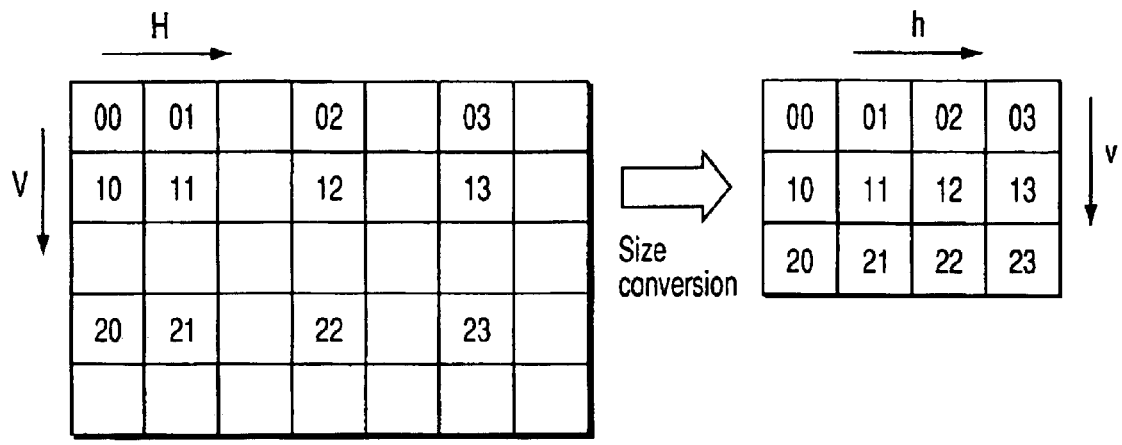
FIG. 6 is a view explaining the scaling of the macro block address in the size converter.
Figure 7:
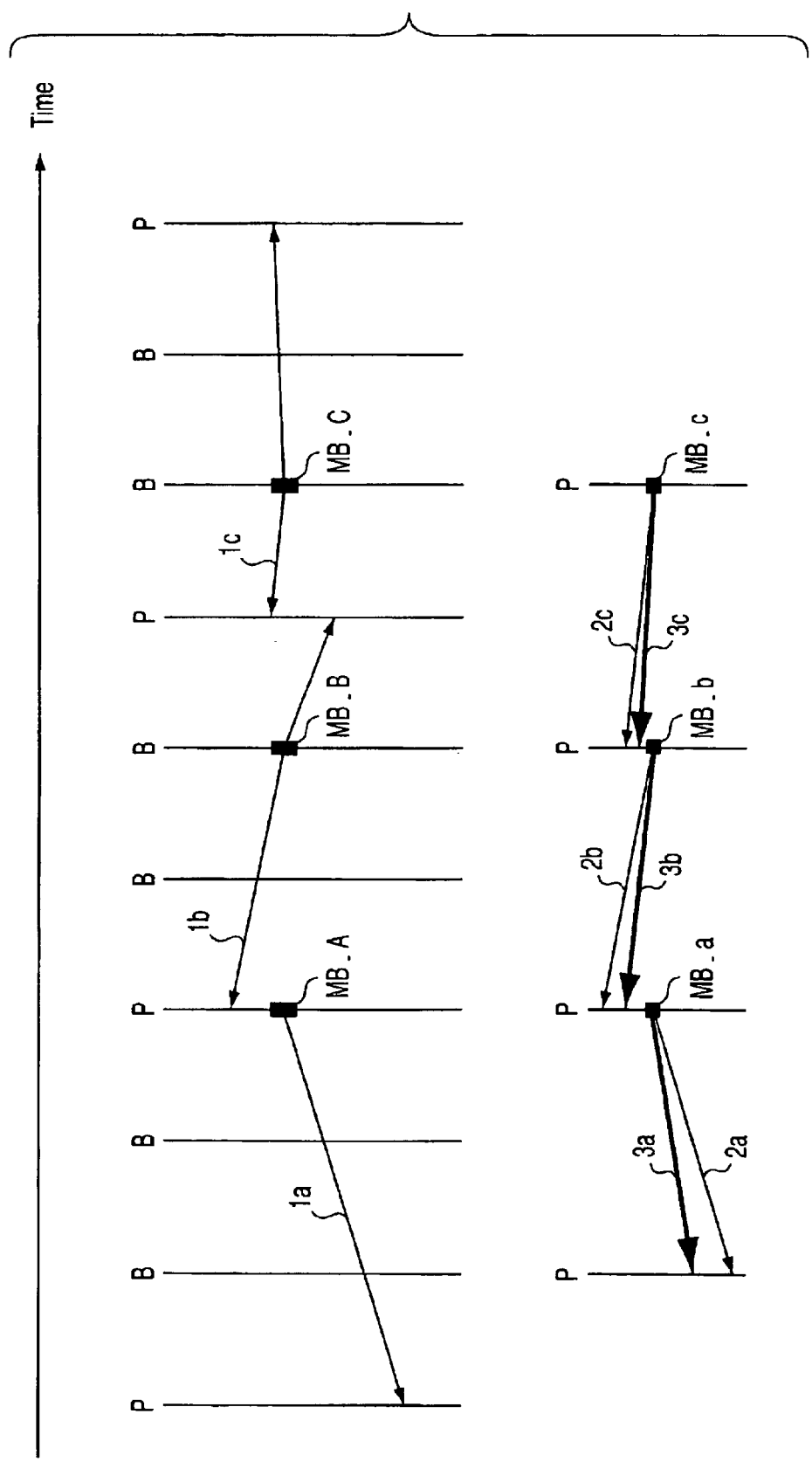
FIG. 7 is a view explaining the scaling of the motion vector in the size converter.

After the macro blocks before and after screen size conversion correspond to each other as shown in FIG. 6, scaling of motion vectors corresponding to the frame interval as shown in FIG. 7 is executed.

In FIG. 7, macro-blocks MB_a, MB_b and MB_c after screen size conversion correspond to macro-blocks MB_A, MB_B and MB_C before screen size conversion. In this time, motion vectors 3a, 3b and 3c assigned to the macro-block MB_a, MB_b and MB_c after screen size conversion are obtained by scaling motion vectors 2a, 2b and 2c according to a screen size ratio.

The motion vectors 2a, 2b and 2c are obtained by scaling motion vectors 1a, 1b and 1c of the macro blocks MB_A MB_B and MB_C before screen size conversion according to the frame interval ratio.

If motion vectors are not existed in the macro-blocks MB_A, MB_B and MB_C before screen size conversion, it is assumed that the macro blocks MB_a, MB_b and MB_c after screen size conversion include no motion vector.

The motion vector detector 209 of the MPEG-4 encoder 14 (FIG. 2) can detect motion vectors by a low throughput by searching the vicinity (±one pixel) of the motion vectors 3a, 3b and 3c. If there are no motion vectors 3a, 3b and 3c, several pixels (for example, ±16 pixels) of the periphery of zero vector are searched for as reference with the zero vector.

(Indexing Device 16)

Figure 8:
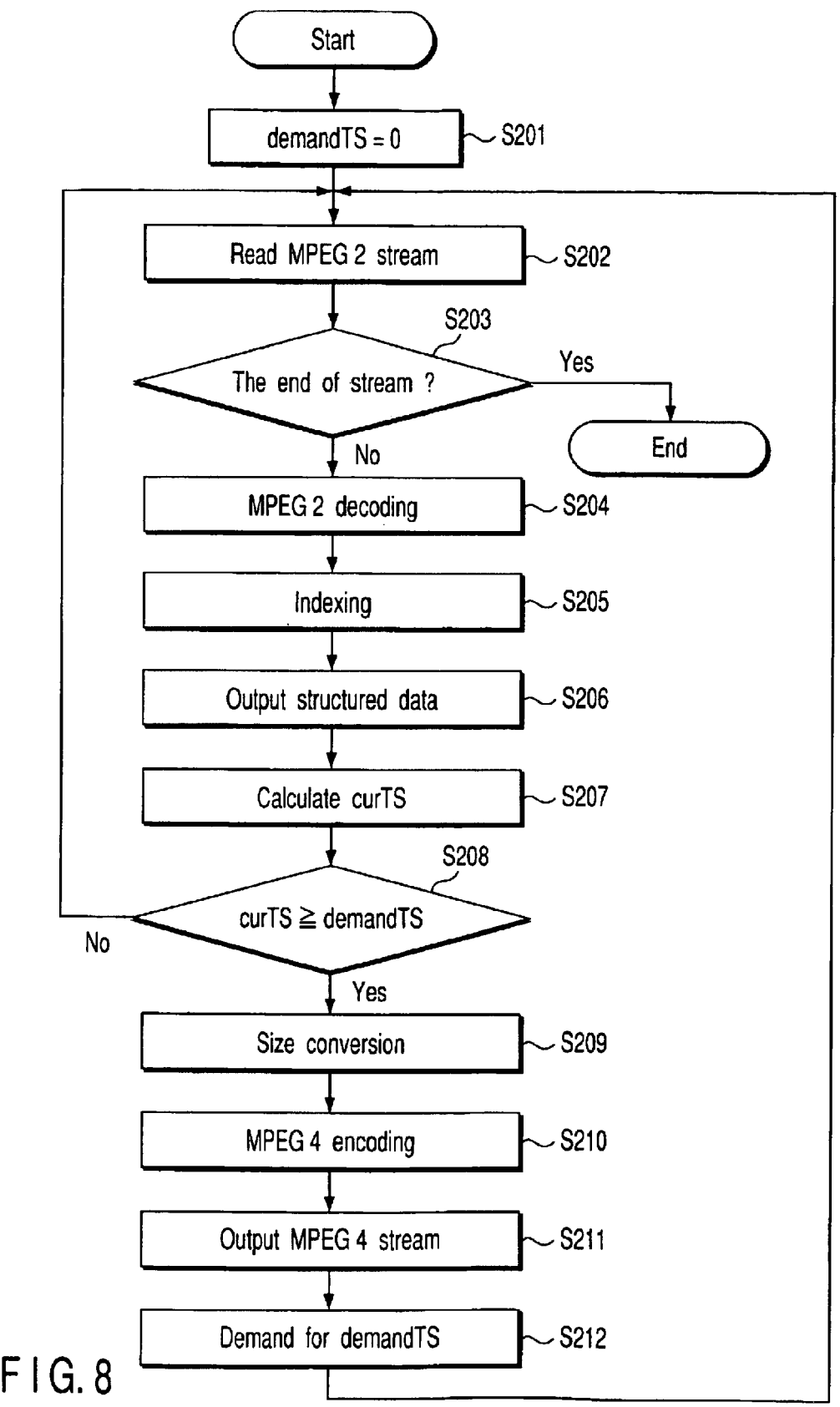
FIG. 8 is a flow chart for explaining the proceeding of the indexing.

There will now be described the indexing device 16 in conjunction with FIGS. 8 and 9.

The present embodiment performs a video transcoding from an MPEG-2 format to an MPEG-4 format and indexing of the video signal to generate structured data. The indexing device 16 in FIG. 1 extracts motion vector information from the side information A3 output from the MPEG-2 decoder 12, and inputs it to a motion vector extractor 902. This motion vector extractor 902 performs indexing (cut detection, i.e., detection of a scene change) according to the motion vector information.

The indexing routine will be described in conjunction with a flowchart of FIG. 8.

At first, the initial value of the time stamp (demandTS) of a frame required by the MPEG-4 encoder 14 is set by zero, for example (step S201). The MPEG-2 stream A1 stored in the MPEG-2 stream storage device 11 is written in the stream buffer of the MPEG-2 decoder 12 (step S202). It is determined whether a stream read in step S202 is the end of MPEG-2 stream A1 (step S203). If the determination is YES, the video transcoding is finished. If the determination is NO, the MPEG-2 stream A1 is decoded by the MPEG-2 decoder 12 (step S204). As a result, the video signal A2 and side information A3 are reconstructed.

Figure 4:
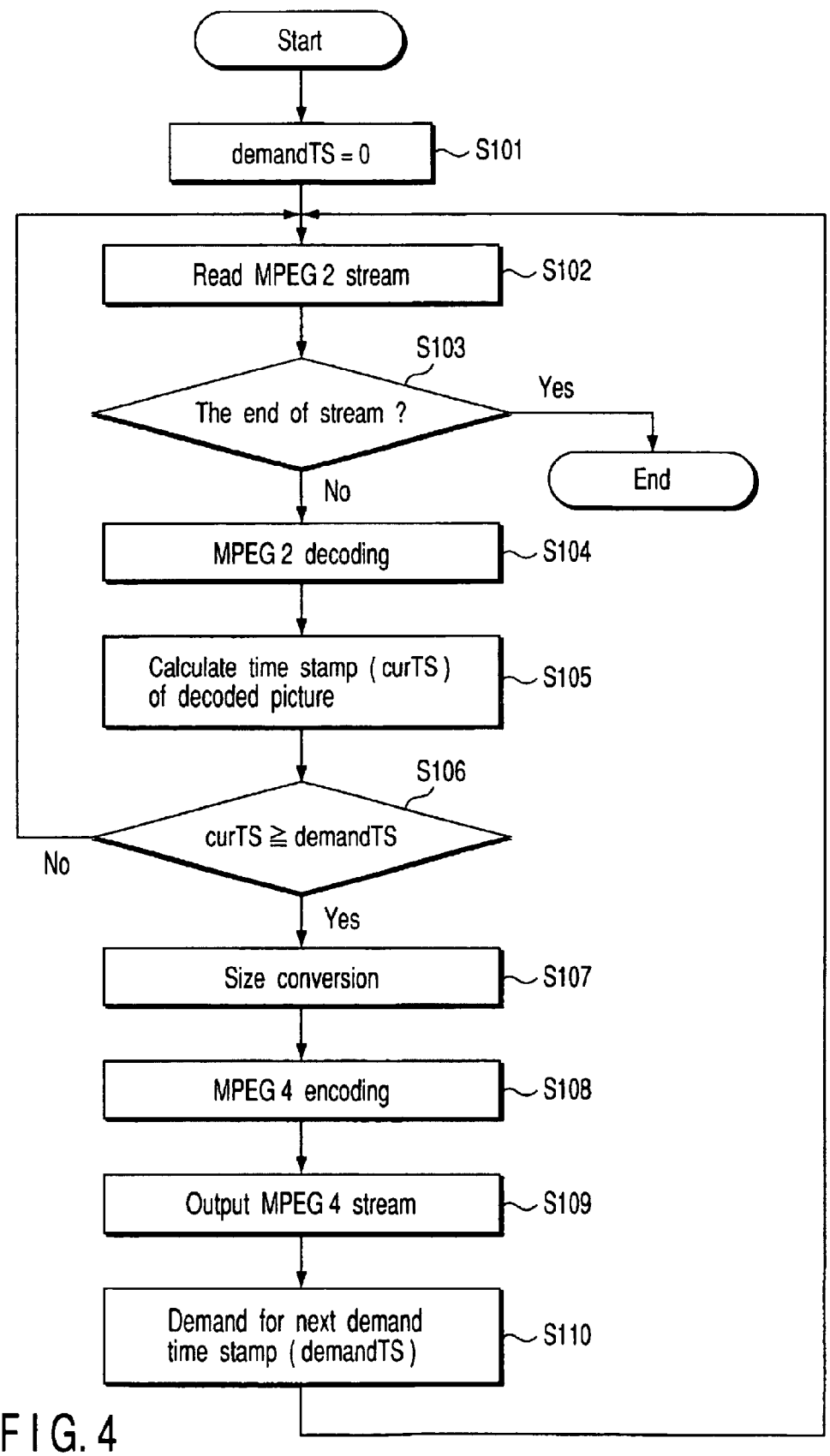
FIG. 4 is a flow chart for explaining the processing of the size conversion.

The above processing is the same as the steps S101–S104 in FIG. 4. The indexing device 16 performs the indexing using the motion vectors included by side information A3 (step S205). The thumb nail corresponding to the indexing result obtained in step S205 is output as structured data to the structured data storage device 17 (step S206). The thumb nail is obtained by reducing a picture corresponding to the indexing result. By the structured data, a user can easily ensure a cutting position of MPEG-2 stream A1 and MPEG-4 stream A6 and the contents thereof.

The processing following the above is similar with the steps S105–S110 shown in FIG. 4. That is, after step S206, the time stamp curTS of the picture of the video signal A2 obtained by the MPEG-2 decoder 12 is extracted from the side information A3 (step S207). The time stamp curTS is compared with the time stamp demandTS of the requested frame (step S208). When the time stamp curTS is smaller than the time stamp demandTS, the processing returns to step S202 to repeat steps S202 to S207.

When time stamp curTS is larger than time stamp demandTS, the reconstructed video signal A2 corresponding to the picture and side information A3 are input to the size converter 13. The size converter 13 converts the video signal A2 and side information A3 supplied from the MPEG-2 decoder 12 in a format suitable for the MPEG-4 encoder 14. The converted video signal A4 and side information A5 are input to the MPEG-4 encoder 14 (step S209).

The MPEG-4 encoder 14 encodes (compression-encodes) the converted video signal A4 using motion vector information included by the side information A5 from the size converter 13 (step S210). The MPEG-4 stream A6 generated by the MPEG-4 encoder 14 is output to the MPEG-4 stream storage device 15, for example (step S211).

Furthermore, the time stamp of the next frame which corresponds to the frame skipping interval determined by the MPEG-4 encoder 14 (demandTS) is obtained (step S212). Thereafter, the processing returns to step S202 to repeat steps S202 to S212.

The indexing (cut detection) using the motion vectors will be described hereinafter referring to FIG. 9.

Figure 9:
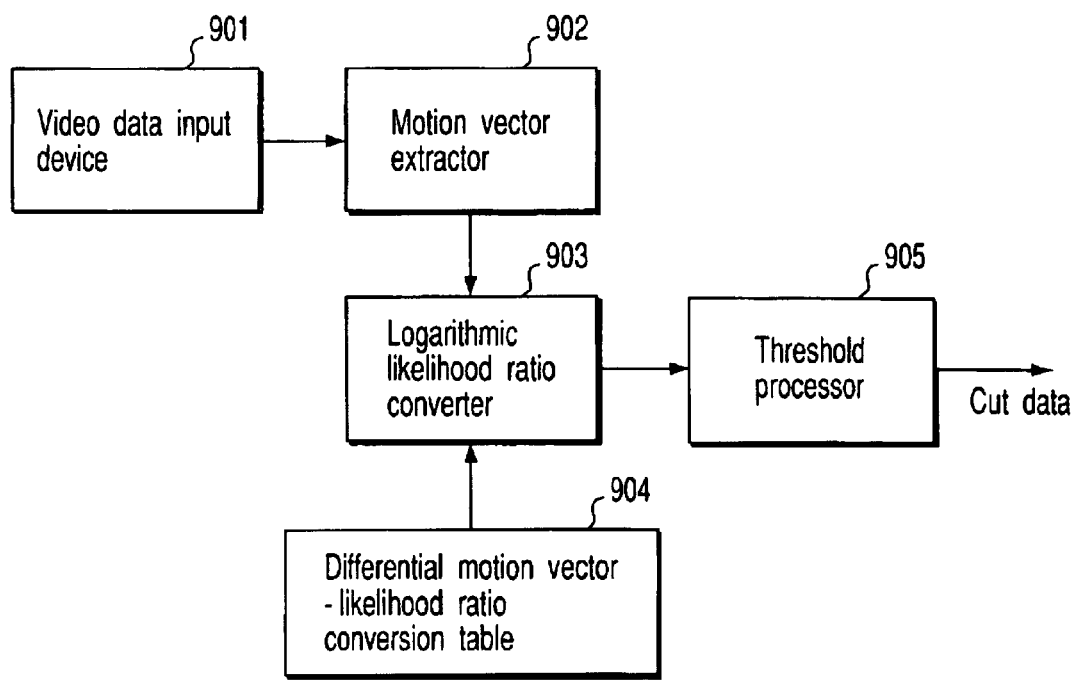
FIG. 9 shows a block circuit diagram of the indexing device using the motion vectors.

FIG. 9 shows a processor which performs a cut detection, for example, detection of scene change, using a table indicating motion vectors and likelihood ratio. A cut is detected using motion vectors, because distribution of motion vectors largely varies by presence or absence of the cut.

Since motions of the background and object continue in continuous frames in the same shot, the motion vectors of approximate macro blocks are often similar to one another. However, since a prediction does not hit between the frames interposing the cut, the frames include often no motion vector. In this case, an inter-frame prediction encoding is not used. Even if the prediction is used, the motion vectors largely different from the peripheral macro blocks are apt to be easily generated. In B picture, it tends to be hard to be used a prediction of picture in the direction to which the cut exists in the future and past reference pictures.

In FIG. 9, the video data input device 901 fetches video data compressed by MPEG. The motion vector extractor 902 decodes partially or entirely the video signal and extracts motion vector.

The logarithmic likelihood ratio converter 903 calculates, from the motion vector data extracted by the motion vector extractor 902, an evaluation value indicating absence or presence of cut for each frame using a difference vector-likelihood ratio conversion table 904, and analysis value of cut presence every frame is calculated. The difference motion vector is a difference vector between the motion vectors of the current macro block and near macro block in coding sequence. The logarithmic likelihood ratio is used as analysis value. The logarithmic likelihood ratio per frame is obtained by calculating logarithmic of likelihood ratio of the difference vector for each macro block in the frame and adding the resultant logarithms.

The difference motion vector-likelihood ratio translation table 904 must be prepared ahead of processing beforehand. Therefore, the appearance number of times Nc(Vi) of difference motion vectors Vi when the cut (Vi) is included, and the appearance number of times Nn(Vi) when no cut is included are calculated using the video data wherein the cut point is already known. In this time, the likelihood ratio of Vi is calculated by the following equation:

$$\left(N_c(V_i) \Big/ \sum_j N_c(V_j)\right) \Big/ \left(N_n(V_i) \Big/ \sum_j N_n(V_j)\right)$$

At last, a threshold processor 905 compares a logarithmic likelihood ratio per frame output by the logarithmic likelihood ratio converter 903 with a threshold value previously set. When the likelihood ratio exceeds a threshold value, this indicates existence of the cut. Otherwise, the threshold processor 905 outputs data indicating no cut.

There will now be described a transcoding apparatus of encoded video data according to another embodiment of the present invention in conjunction with FIGS. 10 to 13D.

In the present embodiment, when the video encoding is transcoded from an MPEG-2 format to an MPEG-4 format, the video encoding is transcoded to the MPEG-4 format with high picture quality by using an analysis result of the video data.

Figure 10:
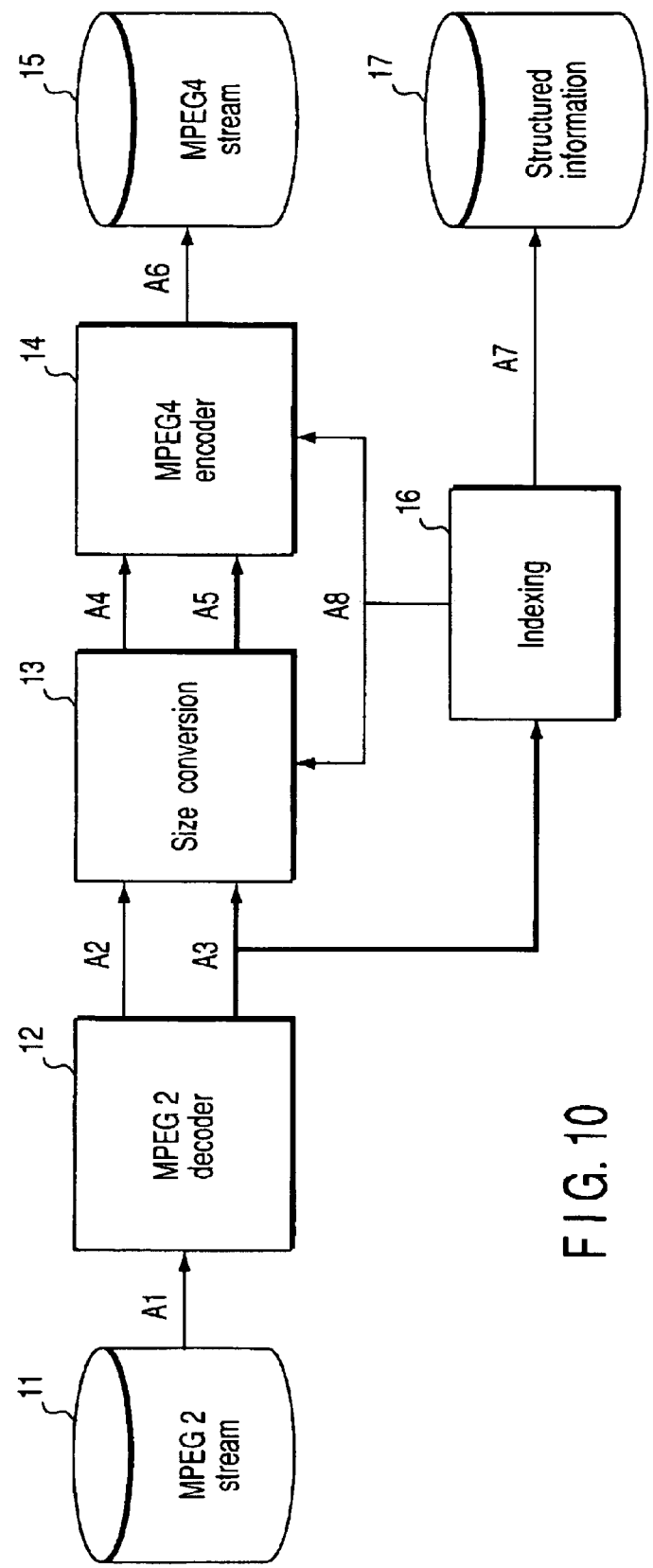
FIG. 10 shows a block circuit diagram of a video transcoding apparatus according to the second embodiment of the invention.

The indexing device 16 shown in FIG. 10 extracts motion vector information from the side information A3 output from the MPEG-4 decoder 12, and performs indexing according to the processing of FIG. 9. In this time, distribution of motion vector is obtained as shown in FIG. 11, and then the indexing is executed. In other words, the indexing device 16 obtains information A8 indicating whether an inter-frame prediction hits in. This information A8 should be obtained before starting the processing of the size converter 13 and MPEG-4 encoder 14 of FIG. 1. Therefore, the processing in the size converter 13 and MPEG-4 encoder 14 can be changed adequately.

Figure 12:
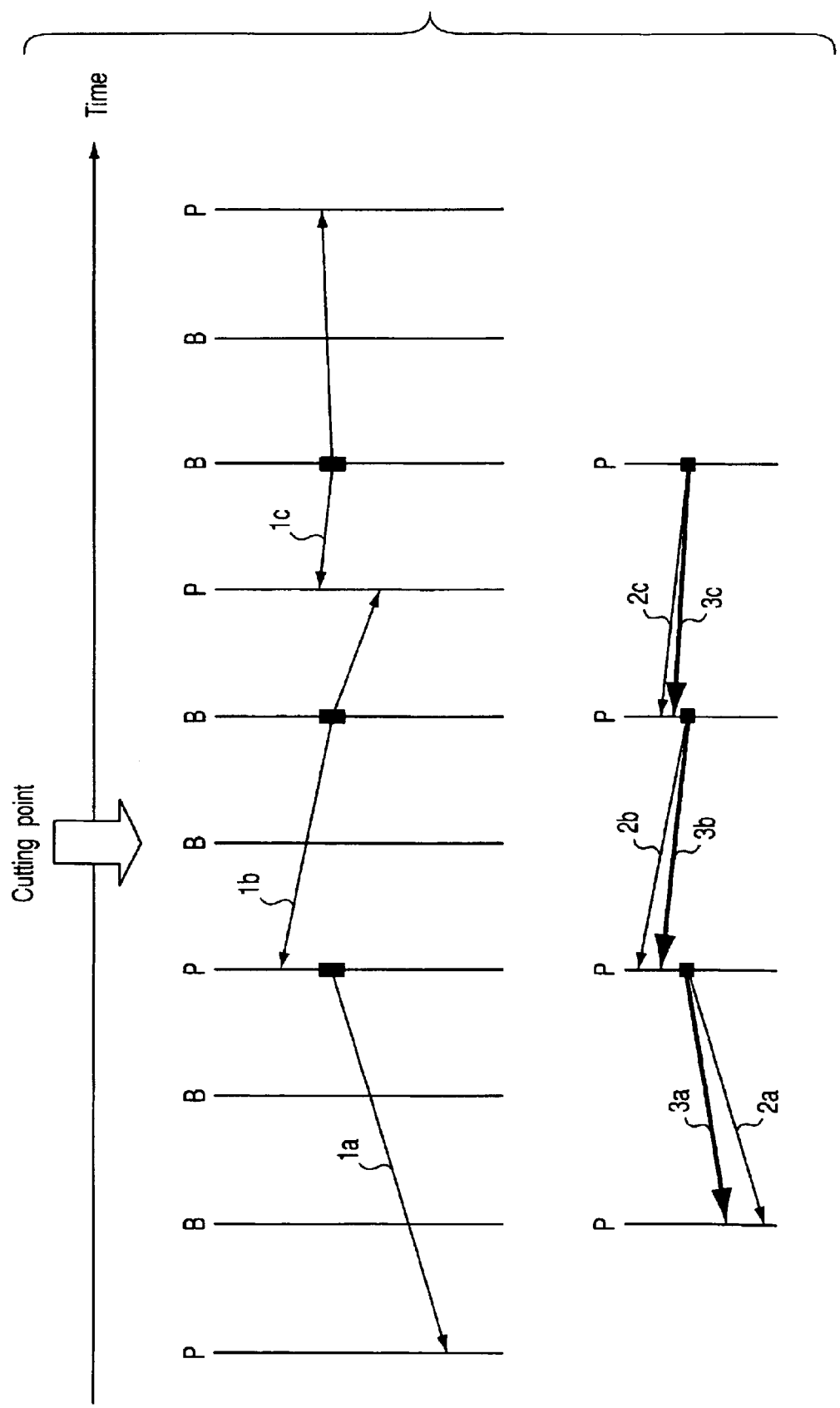
FIG. 12 is a view explaining the scaling of the motion vector by the size converter when a cutting point exists on the way.

Concretely, when the indexing device 16 detects a cut point (scene change) at a position shown in FIG. 12, a forward direction vector 1b cannot be trusted. Accordingly, the following method is adopted.

a) The range that periphery of the motion vector 3b obtained by size conversion is re-searched for by the MPEG-4 encoder 14 is set more broadly usually. As a result, motion vectors of high reliability are detected.

b) The MPEG-4 encoder 14 forcibly performs an intra-frame encoding without pursuing motion vector with the size converter 13.

When the video encoding is transcoded at higher speed from the MPEG-2 format to the MPEG-4 format, the throughput of the motion vector detection is clipped. Thus, the video encoding is preferably performed by an intra-frame encoding.

FIGS. 13A to 13D show examples of distribution of motion vectors.

Figure 13A:
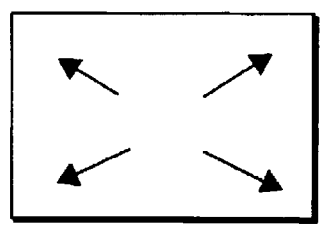
FIGS. 13A to 13D are views illustrating the kind of distribution of the motion vectors.
Figure 13B:
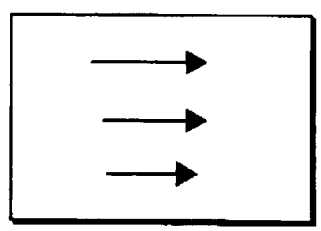
Figure 13C:
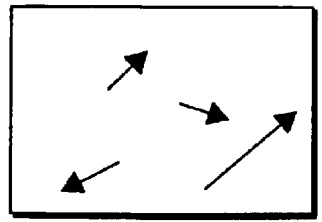
Figure 13D:
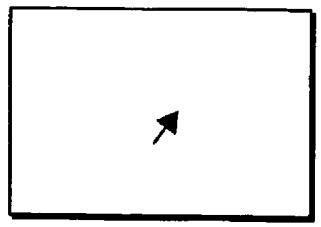

FIG. 13A shows the motion vectors distributed radially. FIG. 13B shows the motion vectors distributed uniformly. FIG. 13C shows the motion vectors distributed separately. FIG. 13D shows a status where few vectors exist.

By supplying information A8 of distribution of motion vectors classed in plural groups to the size converter 13 and MPEG-4 encoder 14, the appropriate re-search range of motion vectors can set every group. Therefore, appropriate motion vectors are obtained in a fixed re-search range, and the MPEG-4 encoding is executed with high picture quality.

When the motion vectors are aligned not uniformly as shown in FIGS. 13A and 13C, the re-search range is set more broadly in comparison with FIGS. 13B and 13D.

In addition, by supplying, to the size converter 13 and MPEG-4 encoder 14, information A8 of distribution of motion vectors classified in plural groups, appropriate transcoding method of the screen size can be selected every group. Thus, high-resolution MPEG-4 encoding is executed by the MPEG-4 encoder 14.

When the motion vectors are aligned not uniformly as shown in FIGS. 13A and 13C, the filtering in down-sampling is powerfully applied in comparison with FIGS. 13B and 13D. In other words, the MPEG-4 encoder 14 is controlled by information A8 indicating a predictive state according to the distribution of motion vectors. The intensity of the filter is changed according to the information A8. When the cut-off frequency is high, the filter is intense. In characteristics shown in FIGS. 14A and 14B, the filter having characteristic shown in FIG. 14B has higher intense filtering function than that shown in FIG. 14A.

As discussed above, according to the present invention, when a video compression method is converted to another video compression method (for example, transcoded into MPEG-4 format from MPEG-2 format), using motion vector information of the decoder, the throughput of encoding can be largely reduced. Furthermore, the indexing can be executed using the motion vector information together with the encoding.

The video transcoding can be executed with high picture quality by using indexing result when transcoding into MPEG-4 format.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video transcoding method, comprising:
    decoding a first bit stream encoded by a first video encoding format to obtain decoded video data and side information;
    converting the decoded video data and side information corresponding to the first video encoding format into a form suitable for a second video encoding format to obtain converted video data and side information;
    encoding the converted video data in the second video encoding format using motion vectors contained in the side information to obtain a second bit stream of the second video encoding format; and
    indexing the decoded video data using the side information to mark on a picture corresponding to scene change and generate structured information representing a marked picture, and wherein the encoding encodes the decoded video data using the structured information to obtain the second bit stream of the second video encoding format.

2. A method according to claim 1, wherein the converting converts the decoded video data and side information into the form suitable for the second video encoding format, using the structured information.

3. A method according to claim 1, wherein the converting includes changing filtering intensity for down-sampling when converting the decoded video data into the form suitable for the second video encoding format.

4. A method according to claim 1, wherein the encoding includes re-searching a periphery of each of motion vectors contained in the side information and changing a re-searching range according to the structured information.

5. A method according to claim 4, wherein the re-searching step re-searches the periphery of motion vectors in units of one pixel.

6. A method according to claim 1, wherein the indexing includes indexing the video data using the side information at the same time when the converting step converts the decoded video data and size information.

7. A method according to claim 1, wherein the first video encoding format corresponds to MPEG-2 encoding and the second video encoding format corresponding to MPEG-4 encoding.

8. A method according to claim 1, wherein the indexing includes indexing the video data using motion vectors included in the side information.

9. A video transcoding apparatus comprising:
    a decoder which decodes a first bit stream encoded by a first video encoding format to output decoded video data and side information corresponding to the first video encoding format;
    a converter which converts the decoded video data and side information into a form suitable for a second video encoding format to output converted video data and side information;
    an encoder which encodes the converted video data in a second video encoding format, using motion vectors contained in the converted side information to output a second bit stream of the second video encoding format; and
    an indexing device which indexes the decoded video data using the side information to mark on a picture corresponding to scene change and generate structured information representing a marked picture, and wherein the encoder encodes the decoded video data using the structured information to obtain the second bit stream of the second video encoding format.

10. An apparatus according to claim 9, wherein the indexing device indexes the decoded video data using the decoded side information, at the same time when the converter converts the decoded video data and size information.

11. An apparatus according to claim 10, wherein the indexing device indexes the video data in accordance with a distribution of the motion vectors contained in the side information.

12. An apparatus according to claim 9, wherein the converter converts the decoded video data and side information into a size suitable for the second video encoding format, using the structured information.

13. An apparatus according to claim 9, wherein the converter includes a function which changes filtering intensity for down-sampling when converting the decoded video data into the form suitable for the second video encoding format.

14. An apparatus according to claim 9, wherein the encoder includes a re-searching device configured to re-search a periphery of each of motion vectors contained in the side information and change a re-searching range according to the structured information.

15. An apparatus according to claim 14, wherein the re-searching device re-searches the periphery of motion vectors in units of one pixel.

16. An apparatus according to claim 9, wherein the first video encoding format corresponds to MPEG-2 encoding and the second video encoding format corresponding to MPEG-4 encoding.

17. A video transcoding program stored on a computer readable medium, comprising:

code means for causing a computer to decode a first bit stream encoded by a first video encoding format and output decoded video data and side information;

code means for causing the computer to convert the decoded video data and decoded side information into a form suitable for a second video encoding format and output converted video data and side information; and code means for causing the computer to encode the converted video data in a second video encoding format, using motion vectors contained in the side information and output a second bit stream of the second video encoding format;

code means for causing the computer to index the decoded video data using the side information to mark on a picture corresponding to scene change and generate structured information representing a marked picture; and code means for causing the computer to encode the decoded video data using the structured information to obtain the second bit stream of the second video encoding format.

18. A video transcoding program according to claim 17, wherein the first video encoding format corresponds to MPEG-2 encoding and the video second video encoding format corresponding to MPEG-4 encoding.

* * * * *